United States Patent
Hieter et al.

[19]

[11] Patent Number: 5,877,965
[45] Date of Patent: *Mar. 2, 1999

[54] PARALLEL HIERARCHICAL TIMING CORRECTION

[75] Inventors: Nathaniel Douglas Hieter, Pleasant Valley; Charles Kenneth Hines, Poughkeepsie, both of N.Y.; Todd Edwin Leonard, Williston; Peter James Osler, Jericho, both of Vt.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 671,030

[22] Filed: Jun. 24, 1996

[51] Int. Cl.$^6$ .......................... G06F 9/455; H01L 21/70; H01L 27/02

[52] U.S. Cl. ............................... 364/490; 364/488

[58] Field of Search ..................... 364/578, 489, 364/490, 491; 395/500

[56] References Cited

U.S. PATENT DOCUMENTS

| | | | |
|---|---|---|---|
| 4,386,403 | 5/1983 | Hsieh et al. | 364/300 |
| 4,612,618 | 9/1986 | Pryor et al. | 364/490 |
| 5,095,454 | 3/1992 | Huang | 364/578 |
| 5,111,413 | 5/1992 | Lazansky et al. | 364/578 |
| 5,267,175 | 11/1993 | Hooper | 364/489 |
| 5,363,375 | 11/1994 | Chuang et al. | 370/95.3 |
| 5,396,435 | 3/1995 | Ginetti et al. | 364/489 |
| 5,426,591 | 6/1995 | Ginetti et al. | 364/489 |
| 5,452,239 | 9/1995 | Dai et al. | 364/578 |
| 5,461,576 | 10/1995 | Tsay et al. | |
| 5,521,837 | 5/1996 | Frankle et al. | 364/491 |
| 5,544,088 | 8/1996 | Aubertine et al. | 364/489 |

OTHER PUBLICATIONS

Dillinger et al., "A Logic Synthesis System for VHDL Design Descriptions", Computer Aided Design, 1989 International Conference, pp. 66–69. 1989.

Frankle, Jon, "Iterative and Adaptive Slack Allocation for Performance–Driven Layout and FPGA Routing," Design Auto Mation Conference, 1992 ACM/IEEE Conference, pp. 536–542, 1992.

Meixner et al., "Timing Driven Pin Assignment in a Hierarchical Design Environment," Euro ASIC '91, pp. 212–217, 1991.

Youssef, Habib, "Timing Constraints for Correct Performance," Computer Aided Design, 1990 International Conference, pp. 24–27, 1990.

"Timing–Influenced Layout Design," *IBM Technical Disclosure Bulletin*, vol. 28, No. 11, Apr. 1986, pp. 4981–4987.

*Primary Examiner*—Kevin J. Teska
*Assistant Examiner*—Dan Fiul
*Attorney, Agent, or Firm*—Graham S. Jones, II

[57] ABSTRACT

A method is provided for performing timing correction on a hierarchical integrated circuit design comprising the steps of forming a hierarchical integrated circuit design, applying a hierarchical timing tool to the entire circuit hierarchy, applying a timing correction algorithm to improve timing of the design as measured by the hierarchical timing tool; and applying a parallel timing management tool to multiple applications of the hierarchical timing tool and the timing correction algorithm. Also described is an information handling system including means for implementing the parallel hierarchical timing correction method of the present invention.

8 Claims, 4 Drawing Sheets

PARALLEL HIERARCHICAL TIMING CORRECTION

FIELD OF THE INVENTION

The invention relates to computerized design of integrated circuits. More particularly, the invention relates to using a computer program to evaluate and implement changes in integrated circuit design based on timing correction synthesis algorithms.

BACKGROUND OF THE INVENTION

Integrated circuits grow ever more complex. In particular, very large scale integrated ("VLSI") chip designs grow more complicated every day. It is known in the art to use synthesis algorithms to mathematically evaluate electronic circuits with the help of a computer. In their most simple form, synthesis algorithms express a circuit in terms of a logical truth table and then apply heuristics to the truth table to determine if the circuit can be optimized for various different constraints, such as timing, area, power dissipation, or testability. Synthesis algorithms for the evaluation of chip designs thus are becoming more complex. Accordingly, the complexity of the heuristics (meaning, in general, guidelines or assumptions, based on observed generalities that are not necessarily mathematically precise or fully understood in a scientific sense) applied to the problem of optimal chip design today are vastly more complicated than those available in preceding generations of synthesis tools. However, in the real world, we have neither infinite compute power, infinite time, nor reliable computer systems. We must still be able to turn around the synthesis of large chips rapidly to meet demanding product development schedules.

The traditional way of dealing with these problems is through the introduction of hierarchy in the hardware language ("HDL"). If the pieces of the chip designs being synthesized stay roughly the same size, and it is simply the number of pieces that multiplies to increase the chip design size, then multiple parallel synthesis runs can be used to manage the latency problems of synthesizing the system.

Technology independent optimiztion and technology mapping of large complex integrated circuits can be dealt with effectively in a parallel fashion. However, the timing-correction of a large hierarchical chip design is a difficult problem, which does not succumb to a parallel solution as easily. Unless strict latch-bounding constraints are imposed, it is difficult to resolve the results of timing a piece of a hierarchical chip design by itself (in-vitro) with the results of timing that piece in the context of the timing model of the entire design (in-vivo). The traditional solution to this problem, involves the generation of timing constraints files of arbitrary complexity, specifying factors such as primary input arrival times, transition times, and equivalent drive circuits, primary output required arrival times, and loadings. However, there are always places where the in-vitro timing model using these timing constraints files diverge from the in-vivo.

All effective approaches to timing-correcting large hierarchical structures in parallel also must deal with the parallel-timing-correction convergence problem. Consider the following situation: a hierarchical design with two timing correctable entities. A signal emanates from the first design and is sunk by the second. At the beginning of the first timing-correction iteration, the first design drives the signal out with a high-power buffer. The second immediately buffers that signal and drops it to a number of sinks. This signal is also late, such that timing-correction tries to fix it. Timing correction is run on the first and the second designs in parallel. The timing correction job on the first design decides to eliminate the high-power buffer because the signal is loaded lightly by the second design. Simultaneously, the timing correction job on the second design drops the input buffer because the drive strength of the output buffer driving the signal out of the first design is so high. Both jobs measure that the timing characteristics of the signal in question have improved, where in actuality, when the hierarchy is re-assembled, no progress has been made, and indeed the timing may have gotten worse. If timing-correction is attempted in parallel another time, the reverse happens, and both the input and the output are re-buffered, putting the design back in its original state.

Both the divergence between the timing as measured in the in-vivo versus the in-vitro model, and the parallel-timing-correction convergence problem must be managed appropriately in an effective solution to parallel timing correction of large hierarchical structures.

SUMMARY OF THE INVENTION

An object of the invention is to provide for a timing-correction means that can accurately and efficiently timing correct a hierarchical chip design.

Accordingly, a method is provided for performing timing correction on a hierarchical integrated circuit design comprising the steps of forming a hierarchical integrated circuit design, applying a hierarchical timing tool to the entire circuit hierarchy, applying a timing correction algorithm to improve timing of the design as measured by the hierarchical timing tool; and applying a parallel timing management tool to multiple applications of the hierarchical timing tool and the timing correction algorithm. Also claimed is an information handling system including means for implementing the parallel hierarchical timing correction method of the present invention.

DETAILED DESCRIPTION OF A PREFERRED EMBODIMENT

Figure 1:
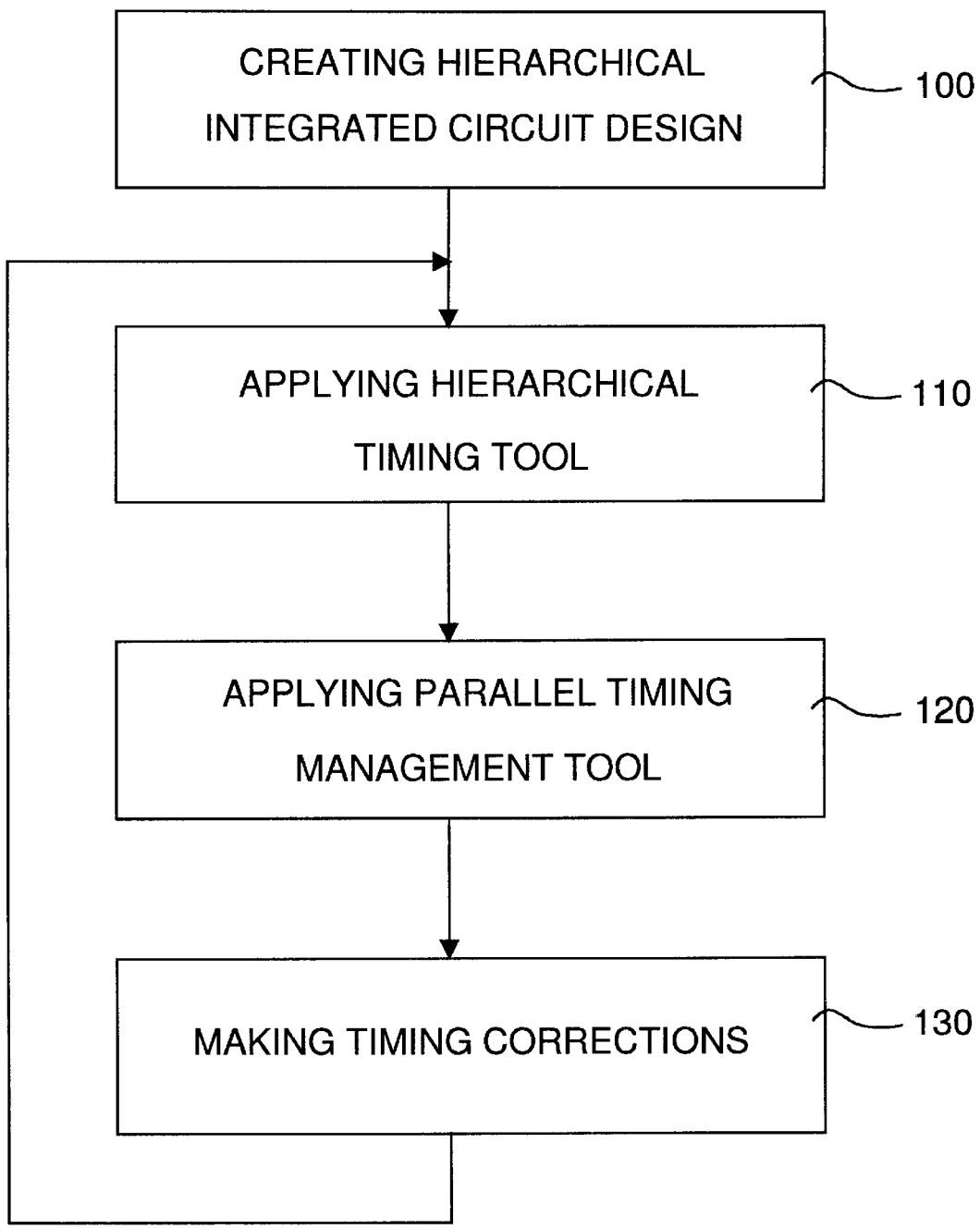
FIG. 1 is a flow chart showing the separate and major aspects of the hierarchical and parallel timing correction operation according to the preferred embodiments of this invention.

The present invention is an effective solution to the timing-correction-of-large-hierachical-structures problem. The invention is called parallel-hierarchical-timing-correction. Referring to FIG. 1, a flow chart is shown of the basic timing correction operation according to the present invention. Block 100 creates a hierarchical design of the integrated chip design, block 110 applies a hierarchical timing tool to the integrated circuit design, block 120 applies a parallel timing management tool to the integrated circuit design, and block 130 makes timing corrections. The two separate and most important aspects 110, 120 are as follows:

HIERARCHICAL TIMING TOOL: The first aspect of the solution works on a hierarchical structure and does not rely on the second aspect of the solution, known as the PARALLEL TAMING MANAGEMENT TOOL. (The solution will work, albeit slowly, if only the HIERARCHICAL NG TOOL is implemented.)

PARALLEL TIMING MANAGEMENT TOOL: The second aspect of the solution uses the PARALLEL TIMING MANAGEMENT TOOL to improve the latency of the solution. The PARALLEL TIMING MANAGEMENT TOOL does not rely on the HIERARCHICAL TIMING TOOL. (A PARALLEL TIMING MANAGEMENT TOOL solution can be implemented without a HIERARCHICAL TIMING TOOL solution, but it does not make too much sense to do this.)

This solution assumes underlying tools that provide three services:

1. Close integration of synthesis and timing:
   Without an accurate timing model, accurate timing correction cannot be accomplished.
2. Incremental timing capability:
   Resolving timing on a large design can take many minutes (45 minutes is not unusual). Accurate timing correction would be prohibitive if every timing correction decision entailed this cost. However, with incremental timing, synthesis can try thousands of potential timing-improvements a second on even the largest of designs, and receive accurate feedback about the efficacy of the changes from the timing subsystem.
3. Hierarchical Timing Tool capability:
   The timing-tool must be able to time the same hierarchical design being timing-corrected.

The simplest form of the Hierarchical Timing Tool of the solution works as follows: The design hierarchy is loaded into the timing/timing-correction system ('the system'), and the hierarchical timing-model is initialized. Then, for each element in the hierarchy, timing-correction is applied. The hierarchical nature of the timing subsystem keeps the timing-model across the entire hierarchy consistent. If the critical path which spans multiple hierarchy boundaries is improved in one hierarchy piece, we see this improvement reflected across the entire hierarchy. In essence, hierarchical timing is maintaining all the boundary constraints within the hierarchy in real time with no loss of accuracy.

This simple approach suffers from a number of problems. First, in this simple approach, timing correction is applied only once to each element in the hierarchy. If only simple heuristics are applied in the process of timing-correction, then the resulting netlist will not have been optimized fully. However, if the most powerful heuristics are applied in the process of timing-correction, the resulting netlist will again be non-optimal. The pieces of the hierarchy timing-corrected initially will have been timing-corrected incorrectly due to gross problems in the other, un-timing correct portions of the netlist. This difficulty is easy to fix, by modifying the simple routine to visit the entire hierarchy more than once, adjusting the amount and power of the heuristic applied by the number of times that the entire hierarchy has been visited. The first time around the hierarchy, timing-correction is applied requesting a small amount of work, fixing gross timing problems. The second time around, mid-levels of work are requested, etc. It is not until all the 'easy' cross-hierarchy timing-problems have been solved that the most advanced heuristics are chosen.

Figure 2:
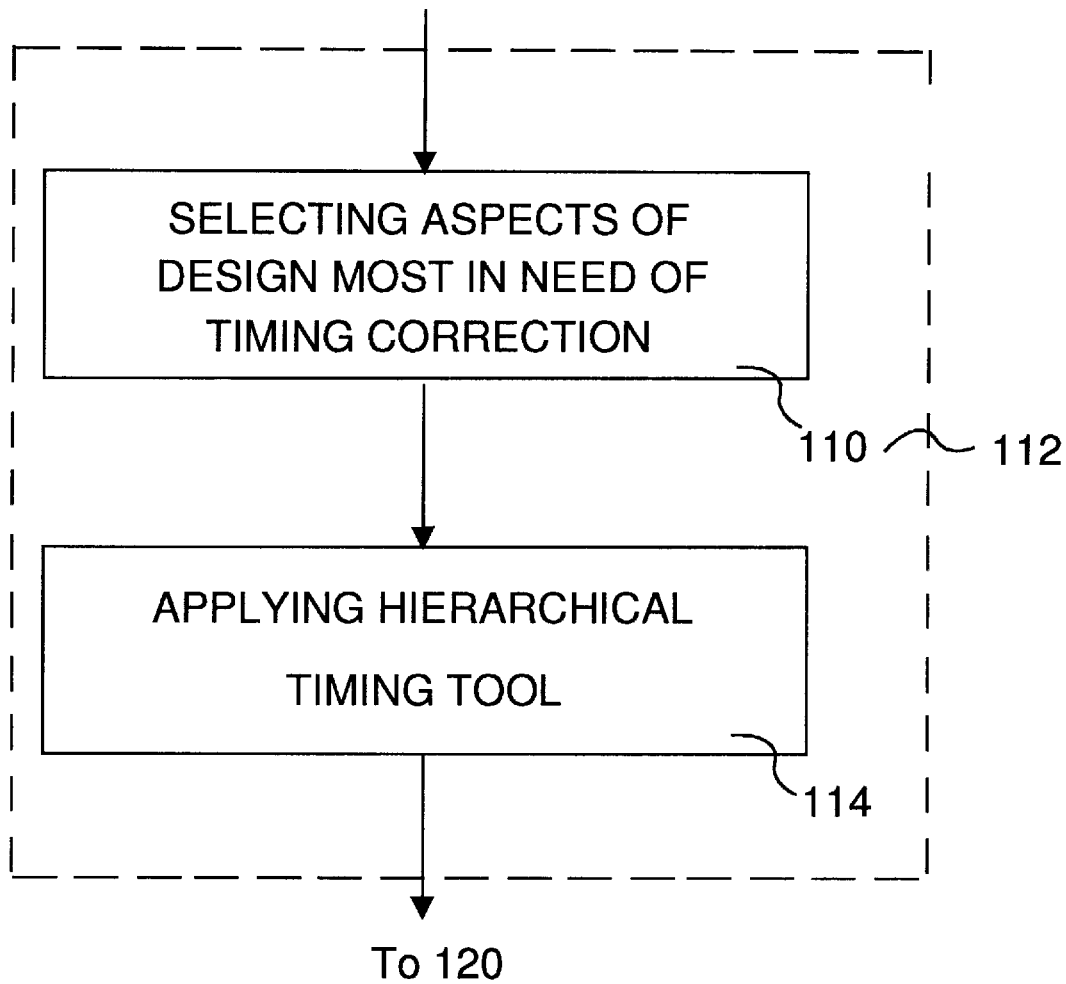
FIG. 2 is a flow chart showing the operation flow for a hierarchical timing tool that selects only the aspects of the design most in need of timing correction according to the preferred embodiments of this invention.

The second problem associated with this simplistic approach is that too much timing-correction is applied. Not all elements in the hierarchy should have attention paid to them. In general, the critical path is contained in a few of the hierarchical elements, and the rest of the design warrants only a cursory pass of timing-correction to eliminate gross problems. Referring to FIG. 2, a flow chart shows further details of block 110 of FIG. 1. Block 112 shows the first step in regards to the hierarchical timing tool is a selection of only the aspects of the design most in need of timing correction. Block 114 shows the next step is to apply the hierarchical timing tool.

Figure 3:
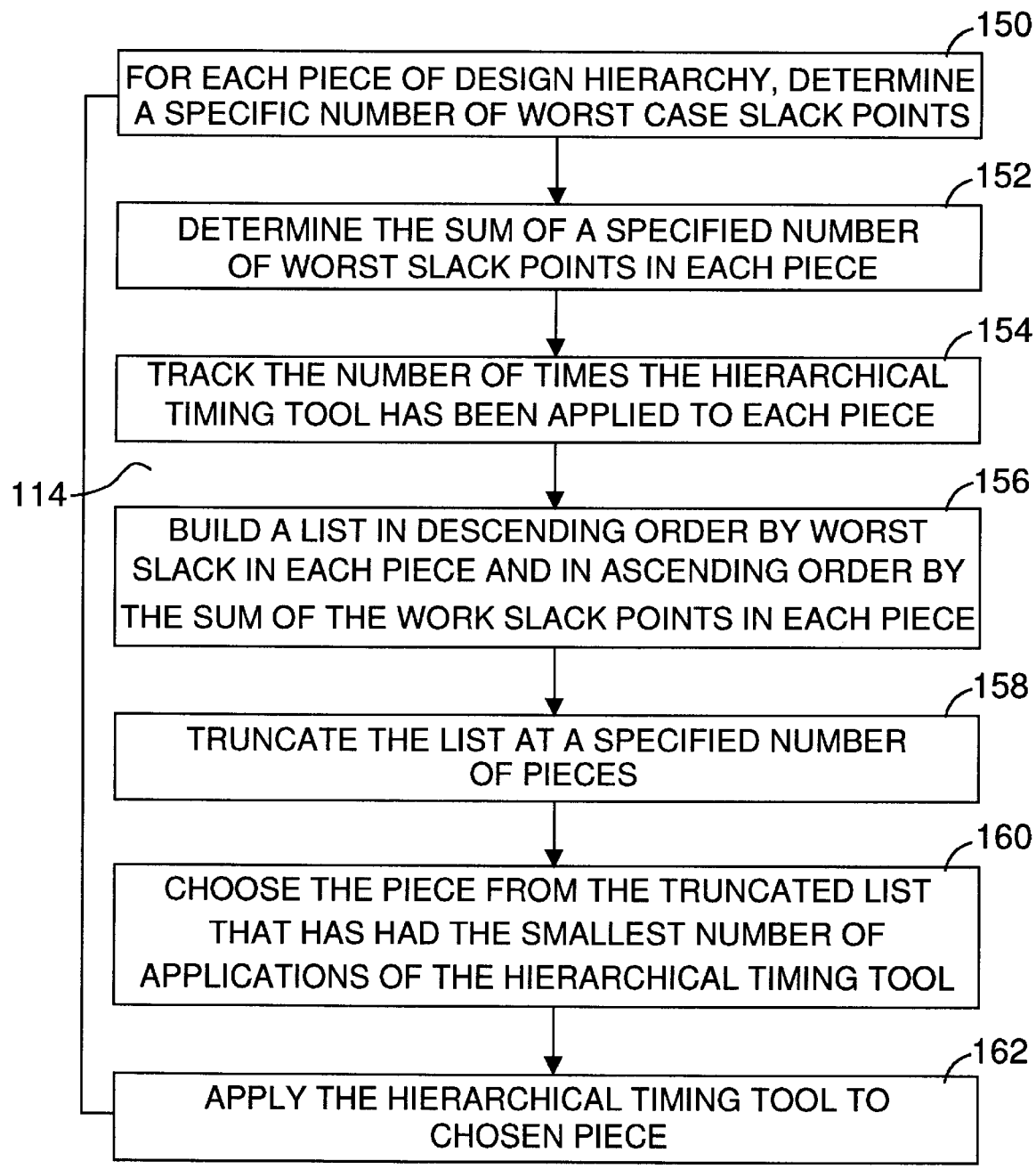
FIG. 3 is a flow chart showing details of the heuristic for applying the hierarchical timing tool to the selected aspects of the design most in need of timing correction according to the preferred embodiments of this invention.

Thus, the solution to the second problem is to choose the elements in the hierarchy based on some measure of their need for timing correction. Referring to FIG. 3, the heuristic that the preferred embodiment implements to solve this problem is shown as a flow chart showing further details of block 114 of FIG. 2. Blocks 150 to 162 of FIG. 3 detail the heuristic for applying the hierarchical timing tool to the selected aspects of the design most in need of timing correction as follows:

For each synthesizable piece in the design hierarchy, determine the worst slack in the piece, the sum of the worst slack of the 32 worst points, and the number of times timing-correction has been applied to that piece.

Build a list of these pieces, major order the worst slack, minor order the sum of the worst slacks.

Truncate the list to the worst-path (all the hierarchy pieces on the worst path will have the same worst slack, and will appear on the top of the list), or 5 pieces, whichever is longer.

Choose the piece from the truncated list that has had the least amount of timing-correction applied, and apply timing-correction based on the number of previous timing-correction passes to that piece.

The invention should in no way be limited to this heuristic. The important point is rather that for maximum effectiveness, the Hierarchical Timing Tool of the invention should include a means for focusing particular attention on those areas of the chip design most in need of timing correction.

Figure 4:
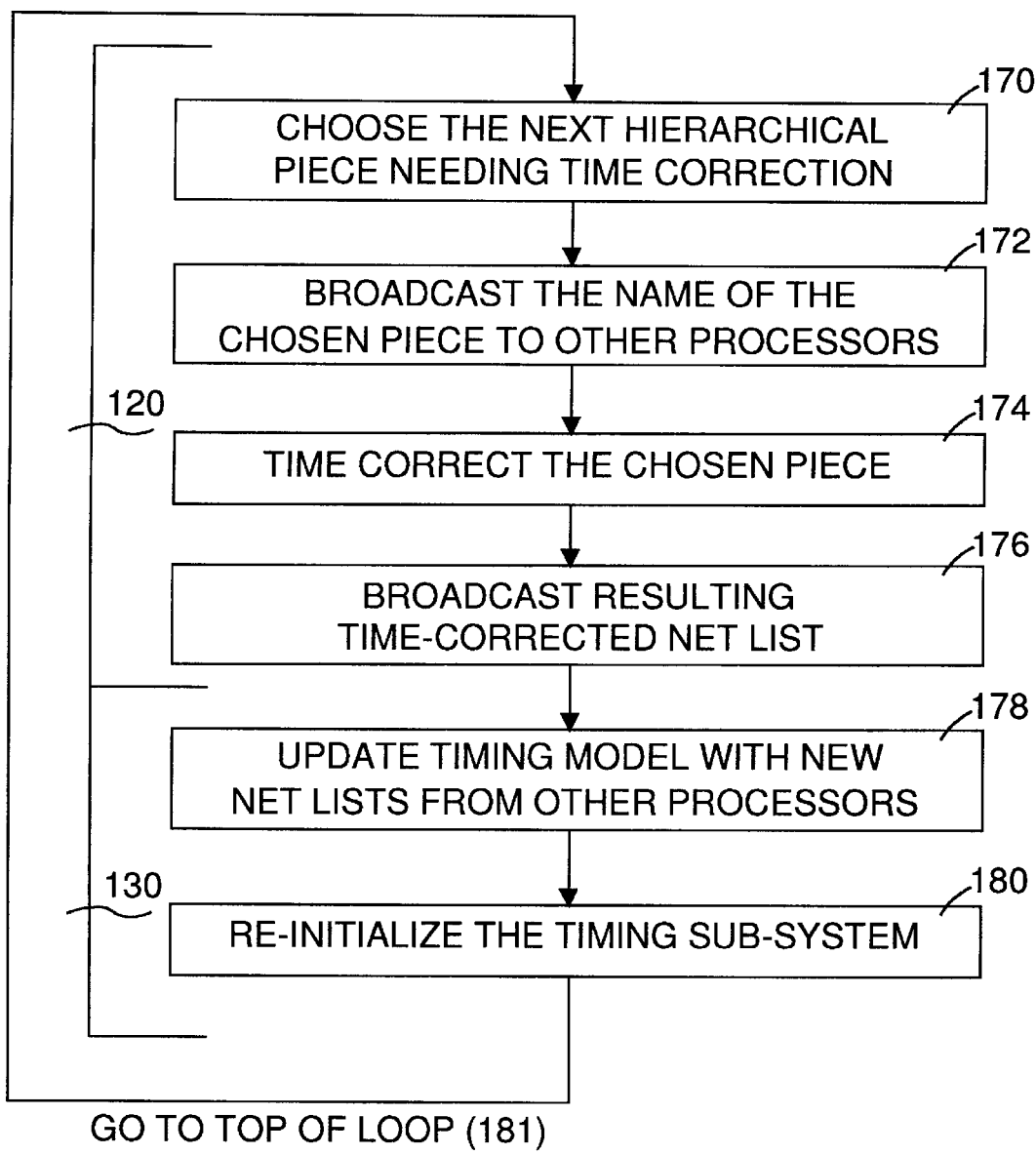
FIG. 4 is a flow chart showing each of a multiple of timing-correction processes that are run in parallel as a parallel timing management tool according to the preferred embodiments of this invention.

The third problem with the simple approach is that it is sequential. The solution to this problem is to extend the system to manage multiple peer timing-correction processes running in parallel. Referring to FIG. 4, a flow chart shows blocks 170 to 180 which present further details of blocks 120 and 130 of FIG. 1, which control the running of multiple timing-correction processes in parallel. Blocks 170 to 176 comprise the Parallel Timing Management Tool, which is the second aspect of the present invention. Each process is in an endless loop of the steps shown by blocks 170 to 180 as follows:

In block 170, close the next hierarchical piece to timing-correct, insuring that piece is not being timing-corrected by any of the other processes that are running in parallel;

In block 170, broadcast the name of the piece, such that all other processes are aware that it is being timing-corrected;

In block 174, timing-correct the chosen piece;

In block 176, broadcast resulting timing-corrected net list for the chosen piece to all other processes;

In block 178, update timing model with new netlists from other processes;

In block 180, re-initialize the timing subsystem;

Go to top of loop.

The parallel timing-correction convergence problem is managed by controlling the number of jobs running simultaneously. When a raw (not timing-corrected) model is loaded into the system, the gross nature of the problems that get corrected far outweigh the subtle boundary-oriented convergence problems, and the system can tolerate a large number of processes running simultaneously. As time progresses, and the timing corrections being introduced become more specific, the susceptibility of those fixes to convergence problems grows. However, the probability of the system hitting both in input and output sides of a hierarchical boundary on the critical path diminish as the number of processes running diminishes.

The foregoing description of the preferred embodiment of the invention describes the invention. However, it will be understood by those skilled in the art that various changes in form and details may be made without departing from the spirit and scope of the invention. Accordingly, the invention is limited only by the following claims and their equivalents.

What is claimed is:

1. A method for performing timing correction on an integrated circuit design comprising the steps of:

creating a hierarchical integrated circuit design (100);

applying a hierarchical timing tool (110) to said integrated circuit design;

applying a parallel timing management tool (120) to a design hierarchy to manage multiple applications of said hierarchical timing tool to different pieces of said design hierarchy; and making timing corrections (130) in said design hierarchy in accordance with the results of the application of said hierarchical timing tool (110) and said parallel timing management tool (120).

2. The method of claim 1, wherein the step of applying said hierarchical timing tool (110) further comprises:

selecting aspects of said design hierarchy most in need of timing correction (112) to provide selected aspects and applying said hierarchical timing tool (110) to said selected aspects (114).

3. A method for performing timing correction on an integrated circuit design comprising the steps of:

creating a hierarchical integrated circuit design (100);

applying a hierarchical timing tool (110) to said integrated circuit design;

applying a parallel timing management tool (120) to a design hierarchy to manage multiple applications of said hierarchical timing tool to different pieces of said design hierarchy; and making timing corrections (130) in said design hierarchy in accordance with the results of the application of said hierarchical timing tool (110) and said parallel timing management tool (120), wherein the step of applying said hierarchical timing tool (110) further comprises:

a. selecting aspects of said design hierarchy most in need of timing correction (112) to provide selected aspects and applying said hierarchical timing tool (110) to said selected aspects (114), b. for each piece of said design hierarchy, determining a specified number of worst slack points in said piece (150);

c. for each piece, determining a sum of a specified number of worst slack points in said piece (152);

d. tracking the number of times said hierarchical timing tool has been applied to each piece (154);

e. building a list of said pieces in descending order by worst slack in each of said pieces and in ascending order by the sum of the worst slack points in said piece (156);

f. truncating said list at a specified number of pieces (158);

g. choosing (160) a chosen piece from said pieces from the truncated list that has had the smallest number of applications of said hierarchical timing tool (110); and h. applying hierarchical timing correction steps to said chosen piece (162).

4. A method for performing timing correction on an integrated circuit design comprising the steps of:

creating a hierarchical integrated circuit design (100);

applying a hierarchical timing tool (110) to said integrated circuit design;

applying a parallel timing management tool (120) to a design hierarchy to manage multiple applications of said hierarchical timing tool to different pieces of said design hierarchy; and making timing corrections (130) in said design hierarchy in accordance with the results of the application of said hierarchical timing tool (110) and said parallel timing management tool (120), choosing (170) a chosen piece from said pieces to which hierarchical timing correction steps should be applied;

broadcasting a name of said chosen piece such that all other processes are aware that said chosen piece is being timing corrected;

applying said hierarchical timing correction steps to said chosen piece; and updating a list of said pieces (178).

5. An information handling system comprising:

a. a plurality of processors;

b. a memory system;

c. a plurality of I/O controllers for controlling a plurality of I/O devices;

d. a system bus connecting said processors, said memory system, and said I/O controllers;

e. an operating system control means for controlling operation of said processors, said memory system and said I/O controllers; and f. means for performing timing correction on an integrated circuit design further comprising:

1. means for creating a hierarchical integrated circuit design;

2. means for applying a hierarchical timing tool to said integrated circuit design;

3. means for applying a parallel timing management tool to a design hierarchy to manage multiple applications of said hierarchical timing tool to different pieces of said design hierarchy; and 4. means for making timing corrections in said design hierarchy in accordance with said results of said application of said hierarchical timing tool and said parallel management timing tool.

6. The information handling system of claim 5, wherein said means for applying said hierarchical timing tool further comprises:

means for selecting aspects of said design hierarchy most in need of timing correction and applying said hierarchical timing tool to said selected aspects.

7. An information handling system comprising:
a. a plurality of processors;
b. a memory system;
c. a plurality of I/O controllers for controlling a plurality of I/O devices;
d. a system bus connecting said processors, said memory system, and said I/O controllers;
e. an operating system control means for controlling operation of said processors, said memory system and said I/O controllers; and
f. means for performing timing correction on an integrated circuit design further comprising:
  1. means for creating a hierarchical integrated circuit design;
  2. means for applying a hierarchical timing tool to said integrated circuit design;
  3. means for applying a parallel timing management tool to a design hierarchy to manage multiple applications of said hierarchical timing tool to different pieces of said design hierarchy;
  4. means for making timing corrections in said design hierarchy in accordance with said results of said application of said hierarchical timing tool and said parallel management timing tool;
  5. said means for selecting aspects of said design hierarchy most in need of timing correction further comprises:
    i. means for determining a specified number of worst slack points in said piece for each piece of said design hierarchy;
    ii. means for determining said sum of a specified number of worst slack points in said piece for each piece of said design hierarchy;
    iii. means for tracking said number of times said hierarchical timing tool has been applied to each piece;
    iv. means for building a list of said pieces in descending order by worst slack in said piece and in ascending order by the sum of the worst slack points in said piece;
    v. means for truncating said list at a specified number of pieces;
    vi. means for choosing said piece from said truncated list that has had said smallest number of applications of said hierarchical timing correction tool; and
    vii. means for applying said hierarchical timing correction tool to said chosen piece, and
  6. means for applying said hierarchical timing tool to said selected aspects.

8. The information handling system of claim 5, wherein said means for applying said parallel timing management tool further comprises:
  3. means for choosing a piece to which said hierarchical timing correction tool should be applied;
  4. means for broadcasting a name of said piece such that all other processes are aware said chosen piece is being timing corrected;
  5. means for applying said hierarchical timing correction tool to said chosen piece; and
  6. means for updating a list of said pieces.

* * * * *